United States Patent [19]

Letter et al.

[11] 4,217,038
[45] Aug. 12, 1980

[54] GLASS COATED POLYSILOXANE CONTACT LENS

[75] Inventors: Eugene C. Letter, Rochester; Kai C. Su, Webster, both of N.Y.

[73] Assignee: Bausch & Lomb Incorporated, Rochester, N.Y.

[21] Appl. No.: 912,786

[22] Filed: Jun. 5, 1978

[51] Int. Cl.$^2$ .................................................. G02C 7/04
[52] U.S. Cl. ............................. 351/160 R; 351/160 H
[58] Field of Search ........................ 351/160 R, 160 H

[56] References Cited

U.S. PATENT DOCUMENTS

| | | | |
|---|---|---|---|
| 2,674,743 | 4/1954 | Gaiser et al. | 3/13 |
| 3,228,741 | 1/1966 | Becker | 351/160 |
| 3,350,216 | 10/1967 | McVannel et al. | 117/47 |
| 3,637,416 | 1/1972 | Misch et al. | 117/72 |
| 3,708,225 | 1/1973 | Misch et al. | 351/160 H |
| 3,814,051 | 6/1974 | Lewison | 118/49 |
| 3,959,105 | 5/1976 | Feneberg et al. | 304/165 |
| 4,055,378 | 10/1977 | Feneberg et al. | 351/160 H |
| 4,143,949 | 3/1979 | Chen | 351/160 H |
| 4,153,641 | 5/1979 | Deichert et al. | 351/160 H |

OTHER PUBLICATIONS

Erb, Robert A., "Method for Protecting Wettable Surfaces on Contact Lenses by Chemical Formation of Inorganic Films," The Franklin Institute, Lab. for Research and Devel., AFSAM Report 61-42, AD257290 NTIS, Springfield, Va 22151.

Primary Examiner—John K. Corbin
Assistant Examiner—Scott J. Sugarman
Attorney, Agent, or Firm—Robert M. Phipps; Frank C. Parker; Ronald L. Lyons

[57] ABSTRACT

A glass coated, flexible, hydrophilic polymeric contact lens having a sufficient amount of oxygen transportability to meet the requirements of the human cornea is disclosed. In addition, this glass coated contact lens is wettable, fillerless, hydrolytically stable, biologically inert, transparent, resilient and soft. The glass coating is substantially colorless, transparent and from about 100 to about 8,000 angstroms thick. The glass may be a silicate glass, a phosphate glass or a germanate glass or mixtures thereof. The contact lens substrate comprises a polymer comprising a poly(organosiloxane) terminally bonded through a divalent hydrocarbon group to a polymerized activated unsaturated group. Further a method of making the glass coated siloxane contact lens is disclosed.

37 Claims, No Drawings

GLASS COATED POLYSILOXANE CONTACT LENS

BACKGROUND OF THE INVENTION

1. Field of the Invention

This invention relates to a novel, flexible, wettable, hydrophilic glass coated polysiloxane contact lens. The glass coated polymeric contact lens has properties in addition to being wettable and hydrophilic, such as, having a sufficient amount of oxygen transportability to meet the requirements of the human cornea, fillerless, flexible, hydrolytically stable, biologically inert, transparent, resilient and soft. The lens comprises an outer coating of substantially colorless transparent glass from about 100 to about 8000 angstroms thick. The glass may be silicate glasses, phosphate glasses, germanate glass or mixtures thereof. The substrate may be a polymer comprising a poly(organosiloxane) $\alpha,\omega$ terminally bonded through a divalent hydrocarbon group to a polymerized activated unsaturated group.

2. Prior Art Statements

U.S. Pat. No. 2,674,743 teaches in pertinent part a contact lens made from a plastic material which contains a coating of silica on the surface of the lens. It is stated at column 2, lines 2-3 of '743 that the resinous materials are in the form of acrylic esters or polymers of styrenes or substituted styrenes. It is further stated at column 4 of '743 at lines 18-30 that plastic materials particularly resin plastics are preferred such as polymers of styrenes or substituted styrenes, although the esters of acrylic and methacrylic acids such as polymethyl methacrylate have been successfully used plus cellulosic plastics. However, no where does it disclose that silicone rubber material such as the polysiloxanes of the instant invention can be coated with glass material. All the substrate materials disclosed in '743 have glass transition temperatures above ambient temperatures i.e. room temperatures. The substrate material of the instant invention has glass transition temperatures below ambient temperatures i.e. room temperatures. Therefore, the plastic materials in '743 at room temperature are very hard materials as compared to a silicon rubber which, as mentioned, has a glass transition temperature below room temperature and is resilient and soft at room temperature. The instant invention comprises coating a rubbery material with glass whereas in '743 a hard plastic is being coated with silica.

U.S. Pat. No. 3,959,105 discloses in pertinent part an article composed of a silicon elastomer which includes silicon dioxide as a filler for the elastomer. The patent teaches that one may use plasma to oxidize and clean the surface of the silicon elastomer. As disclosed in '105 the elastomer uses a silicon dioxide filler and without the filler the silicon elastomer is not strong enough to be used for its intended purpose. In '105 after the ion bombardment the filler i.e., silicon dioxide, is exposed at these bombarded regions. The patent teaches that as a result, the surface of the article becomes hydrophilic. Also it is taught in '105 that the affects achieved are also due to the rupture of the silicon-oxygen and/or silicone-carbon bonds of the silicon elastomer during ion bombardment. It is taught in '105 that as a result of ion bombardment that the remaining regions of the outer silicon elastomer layer is transformed into activated silicon dioxide. In the instant invention there are *no* fillers involved in the polysiloxane substrate material. The instant material is using a fillerless siloxane material which is coated with glass. Also in the instant invention the applicant is coating a continuous layer of glass onto the siloxane material whereas in the teachings of '105 a continuous layer of silica is not being obtained on the surface. Only where the ions have bombarded away the elastomer is the silicon dioxide exposed. Applicant is not only exposing the surface of the instant material, i.e. substrate. to oxygen plasma in an RF field or exposing this substrate to sputter etching, but additionally the invention involves then coating the surface of the substrate with a continuous coating of glass. In the instant invention the applicant continues to coat glass on the surface of the substrate after the substrate has preferably already been oxidized. There is a significant difference between sputtering or coating silica on the surface of a fillerless siloxane material as in the instant invention and having the silica already in the silicone resin as a filler material and then bombarding the surface of the silicone resin with ions in order to expose the filler material wherever the bombardment is sufficient to remove the outer coating of the silicone resin.

U.S. Pat. No. 3,637,416 discloses, in pertinent part, the interposition of a thin continuous polymeric bonding film or layer composed of one or more silanes between the surface of a plastic or elastomeric material substrate and a deposit or coating of silica or silica gel. This final structure may be used to make contact lens. The formula which represents the compounds disclosed in '416 given at column 5, lines 16-23 are silanes and not siloxanes. These are not similar compounds to the siloxanes disclosed in the instant invention.

U.S. Pat. No. 3,708,225 discloses, in pertinent part, that contact lens may be made from polycarbonates and polystyrenes. However, the invention involves the interposition of a thin, continuous polymeric bonding film or layer composed of one or more silanes between the surface of a plastic or elastomeric material substrate and a deposit or coating of silica or silica gel. As mentioned above, silanes are much different compounds than the siloxane compounds used in the instant invention. The silanes disclosed at column 6 of '225 are completely different compounds than the siloxanes of the instant invention.

U.S. Pat. No. 3,350,216, in pertinent part, discloses silicone rubber which is made hydrophilic by dipping it into a solution of titanate. The titanium dioxide family of compounds have an undesirable property such as an extremely high index of refraction e.g. about 2.0 or about, and would not be suitable in the instant invention. The instant invention desires a low index of refraction e.g. 1.6 or below, such as found in the disclosed glasses for coating the instant silicone resinous materials. If a high index of refraction is used more scattering is obtained and a definite undesirable amount of reflection of light is evidenced on the surface.

Robert A. Erb, "Method for Protecting Wettable Surfaces on Contact Lenses by Chemical Formation of Inorganic Films," The Franklin Institute, Laboratories for Research & Development AFSAM Report 61-42, AD257290 NTIS, Springfield, Virginia 22151, in pertinent part, discloses a process of coating poly (methyl methacrylate) PMMA substrates with a thin film of titanium dioxide in order to make the surface hydrophilic for use as contact lenses. It is known that titanium dioxide and like compounds have an undesirable property such as extremely high indexes of refraction so that they are undesirable for use as coatings for contact lenses. High index of refraction gives more light scattering which interfers with the optics of the lens since there is a definite reflection of light on the surface. The glasses of the instant invention should have a relatively low index of refraction, e.g. 1.6 and below. It is known that the index of refraction of titanium dioxide is about 2.0 or above.

U.S. Pat. No. 3,228,741 discloses contact lenses made from silicone rubber particularly hydrocarbon substituted polysiloxane rubber. This silicone material contains fillers such as pure silica to control flexibility, pliability and resiliency of the lenses. The instant polymers require no fillers. Furthermore, '741 does not teach coating the silicone rubber.

U.S. Pat. No. 4,055,378 discloses, in pertinent part, a silicone elastomer contact lens containing a silicone dioxide filler for the elastomer. The filler is necessary in order to give added strength to the elastomer. The silicone elastomer is exposed to gas ions which impinge the outer layer and expose the silicon dioxide filler or transform the outer layer of silicone elastomer to silicone dioxide. It is disclosed that this process changes the hydrophobic surface to a hydrophilic surface. It is preferred in the instant invention to clean the surface of the silicone rubber by exposing the surface to oxygen plasma in a R.F. field or etch the surface with sputter etching but then the silicone rubber contact lens is coated with a continuous coating of glass.

SUMMARY OF THE INVENTION

The present invention involves coating a polysiloxane contact lens with a glass coating from about 100 to about 8000 Angstroms thick. The glass has an index of refraction of 1.6 or below. Preferably the index of refraction is from about 1.4 to about 1.6, most preferably from about 1.46 to about 1.6.

More particularly, the invention comprises a wettable, hydrophilic, glass coated contact lens which comprises a contact lens having a sufficient amount of oxygen transportability to meet the requirements of the human cornea and is fillerless, flexible, hydrolytically stable, biologically inert, transparent, resilient and soft. The glass coated polymeric contact lens has an outer coating of substantially colorless transparent glass which is from about 100 to about 8000 Angstroms thick. The glass has an index of refraction of 1.6 or below. The glass may be silicate glasses, borosilicate glasses, phosphate glasses, germanate glasses and mixtures thereof. The contact lens substrate material of the instant invention has a glass transition temperature below ambient temperatures i.e. room temperature. That is, the substrate and the lens itself is soft at ambient temperatures, i.e. room temperature. By the statement that "the contact lens has a glass transition below ambient temperatures" it is meant that the contact lens is soft and remains soft at room temperatures e.g. above about 0° C. up to about 45° C. By the term soft it is meant that the contact lens measures about 60 or below on the Shore hardness A scale, preferably 25 to 35 on the A scale.

The substrate consists essentially of a poly(organosiloxane) terminally bonded through a divalent hydrocarbon group to a polymerized activated unsaturated group. The substrate of the present invention is fillerless, oxygen permeable, flexible, hydrolytically stable, biologically inert, transparent, resilient and soft. In another embodiment of this invention there are provided polymerizates comprising a poly(organosiloxane) α,ω terminally bonded through a divalent hydrocarbon group to an activated unsaturated group copolymerized with one or more monomers which can be one of lower esters of acrylic or methacrylic acid, styryls, allyls or vinyls. The copolymers are in the form of three dimensional networks which are clear, strong, and can be usually employed in providing a contact lens. The substrates may comprise copolymers which can comprise 0 to 90 parts by weight of one or more of the poly (organosiloxanes) described herein and 10 to 90 parts by weight of the polymerizable monomers. Best results, however, are obtained with copolymers comprising about 90 to 10 parts by weight of the poly (organosiloxanes) described herein 10 to 90 parts by weight of the polymerizable monomer. The three dimensional network polymers which form the substrates of the instant invention are readily prepared by means of conventional free radical polymerization technique. The poly-(organosiloxane) alone or in the presence of comonomers together with about 0.05 to about 2% by weight of free radical initiators may be heated to a temperature of about 30° C. to about 100° C. to initiate and complete the polymerization. The polymerizable monomer, i.e., the poly(organosiloxane), with or without comonomers can preferably be subjected at room temperature to irradiation by UV light in the presence of suitable activators such as benzoin, acetophenone, benzophenone, and the like for a sufficient time so as to form a three dimensional polymer network.

The polymerization can be carried out directly in contact lens molds or can be cast into discs, rods or sheets which can then be fabricated to a desired shape. Preferably the polymerization is carried out while the material is being spin cast such as taught in U.S. Pat. No. 3,408,429.

Many techniques may be used to coat the glass material on the contact lens substrate. The preferred methods are by vacuum evaporation and sputting. In both of these techniques initial plasma treatment or sputter etching is preferred for cleaning and preparing the lens for the glass coating.

Preferably the contact lens of the instant invention comprises a contact lens which has a sufficient amount of oxygen transportability to meet the requirements of the human cornea and is wettable, hydrophilic, fillerless, flexible, hydrolytically stable, biologically inert, transparent, resilient and soft. The polymeric contact lens contains an outer continuous coating of substantially colorless transparent glass from about 100 to about 8000 Angstronms thick. The glass has an index of refraction of 1.6 or below. The glass is selected from the group consisting of silicate glasses, borosilicate glasses, phosphate glasses, germanate glasses and mixtures thereof. The substrate consists essentially of a poly(organosiloxane) terminally bonded through a divalent hydrocarbon group to a polymerized activated unsaturated group, said poly(organosiloxane) having the formula:

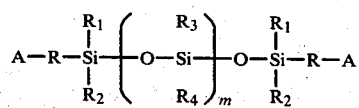

wherein A is an activated unsaturated group, R is a divalent hydrocarbon radical having from 1 to about 22 carbon atoms, $R_1$, $R_2$, $R_3$ and $R_4$ can be the same or different and is selected from the group consisting of a monovalent hydrocarbon radical, a halogen substituted monovalent hydrocarbon radical, each having from 1 to 12 carbon atoms and m is 25 or greater.

The preferred method of coating the contact lens substrates of the instant invention with glass is to first preferably clean the lens by plasma discharge or etch the surface of the lens by sputter etching. Both of these processes improves the adhesion between the glass coating and the siloxane substrates. The sputter etching is the preferred precoating treatment since it improves the lens in several ways as discussed later. After the preferred precoating treatment the siloxane lens may be coated with glass by two preferred techniques sputtering and vacuum evaporation.

DESCRIPTION OF PREFERRED EMBODIMENTS

In accordance with one embodiment of this invention optical soft contact lenses are coated with a glass coating which is from about 100 to about 8000 Angstroms thick with an index of refraction of 1.6 or below. The glass may comprise silicate glasses, borosilicate glasses, phosphate glasses, germanate glasses and mixtures thereof. The substrate comprises a material which has a glass transition temperature below ambient temperature, that is, the material is soft at room temperature. The glass transition temperatures for the contact lens substrates of the instant invention are even below $-100°$ C.

The substrates i.e. uncoated contact lenses, are fabricated from three-dimensional network polymerizates of poly)organosiloxanes) $\alpha,\omega$ terminally bonded through a divalent hydrocarbon group to a polymerized activated unsaturated group. When the term "activated" is used with the term "unsaturated group" herein, it is meant that an unsaturated group which is activated is one which has a substituent which facilitates free radical polymerization. These activated unsaturated groups are polymerized to form the polymers of the instant invention. Preferably, the activating groups used herein lend themselves to polymerization under mild conditions, such as, ambient temperatures.

When the statement is made "a poly(diorganosiloxane) terminally bonded through a divalent hydrocarbon group to a polymerized activated unsaturated group" it is meant that the poly (organosiloxane) compound as described herein has been attached to a compound having a divalent hydrocarbon group, such as, methylene or propylene etc. and then at each end of this compound is attached an activated unsaturated group such as methacryloxy etc. and this then is the most preferred monomer. Then when the monomers are polymerized (i.e. cross-linked) the activated unsaturated groups are polymerizated (free radical polymerization) then the monomers form three dimensional polymers which is the material of which the contact lens substrates are made.

Typically, the poly(organosiloxanes) employed are of the formula:

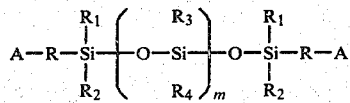

where A is an activated unsaturated group, R is a divalent hydrocarbon radical having from 1 to about 22 carbon atoms, $R_1$, $R_2$, $R_3$ and $R_4$ can be the same or different and each is one of a monovalent hydrocarbon radical or a halogen substituted monovalent hydrocarbon radical each having from 1 to about 12 carbon atoms and m is 25 or greater.

Preferably m is in the range of about 50 to about 800. However, m can be greater than 800. Should one desire to obtain a harder contact lens m should be less than 25.

When the term "soft" is used herein to describe the contact lenses of the instant invention it is meant that m, in the above formula, is 25 or more, preferably from about 50 to about 800. When the term "hard" is used herein to describe the contact lenses of the instant invention, it is meant that m, in the above formula, is less than 25.

Preferably A is 2-cyanoacryloxy; acrylonitryl; acrylamido; acryloxy; methacryloxy; styryl; and N-vinyl-2-pyrrolidinone-x-yl wherein x may be 3, 4 or 5.

More preferably A is acryloxy or methacryloxy. However, other groups containing activated unsaturation can be readily employed, such groups being well known to those skilled in the art. Most preferably A is methacryloxy or acrylamido. R may be preferably an alkylene radical. Therefore, preferably R is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferable R is an alkylene radical having about 1, 3 or 4 carbon atoms. Most preferably R is an alkylene radical having from about 3 to 4 carbon atoms e.g. butylene. Preferably, $R_1$, $R_2$, $R_3$ and $R_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., phenyl, naphthyl and the like; aralkyl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as floromethyl and floropropyl. More preferably $R_1$, $R_2$, $R_3$ and $R_4$ are methyl radicals and phenyl radicals, most preferably $R_1$, $R_2$, $R_3$ and $R_4$ are methyl radicals.

The activated unsaturated group end-capped polysiloxanes employed in this invention as substrates can be prepared by equilibrating the appropriately substituted disiloxane, for example, 1,3-bis(4-methacryloxybutyl) tetramethyl disiloxane, with a suitable amount of a cyclic diorganosiloxane, e.g., hexamethyl cyclotrisiloxane, octaphenyl cyclotetrasiloxane, hexaphenylcyclotrisiloxane, 1,2,3-trimethyl-1,2,3-triphenylcyclotrisiloxane, 1,2,3,4-tetramethyl-1,2,3,4-tetraphenyl cyclotetrasiloxane and the like in the presence of an acid or base catalyst. The degree of softness, the physical properties such as tensile strength, modulus and percent elongation will determine the amount of cyclic diorganosiloxane equilibrated with the disiloxane. By increasing the amount of cyclic siloxane one increases m.

The reaction between a cyclic diorganosiloxane and disiloxanes, although not specifically disclosed for the disiloxanes employed in this invention as to provide the activated unsaturated groups as the end caps for polysiloxanes, is a conventional reaction and described by, for example, Kojima et al. Preparation of Polysiloxanes Having Terminal Carboxyl or Hydroxyl Groups, J.

Poly. Sci., Part A-1, Vol. 4, pp 2325-27 (1966) or U.S. Pat. No. 3,878,263 of Martin issued Apr. 15, 1975, incorporated herein by reference.

The poly(organosiloxanes) α,ω terminally bonded through a divalent hydrocarbon group to a polymerized activated unsaturated group are generally clear, colorless liquids whose viscosity depends on the value of m. These monomers can be readily cured to cast shapes by conventional methods such as UV polymerization, or through the use of free radical initiators plus heat. Illustrative of free radical initiators which can be employed are bis(isopropyl) peroxy dicarbonate, azobisisobutyronitrile, acetyl peroxide, lauroyl peroxide, decanoyl peroxide, benzoyl peroxide, tertiarybutyl peroxypivalate and the like.

In order to further control the properties of the polymers used in the instant invention one can polymerize a mixture of the monomers comprising monomers having a low value of m and monomers having a high value for m. When m has a low value i.e., below 25, the resulting contact lenses substrates i.e. uncoated, are relatively hard, oxygen transporating, hydrolytically stable, biologically inert, transparent and do not need fillers to improve the mechanical properties. The monomers have a relatively low molecular weight and as a result the viscosity is low enough e.g. about 3 centistokes so that the lenses may be easily spin cast. However, when m has a relatively high value i.e., 25 or above, the resulting contact lenses substrate i.e. uncoated, become relatively soft, oxygen transporting, flexible, hydrolytically stable, biologically inert, transparent, resilient, and do not need fillers to improve the mechanical properties. The glass transition temperature of this material is below room temperature e.g. even below −100° C., so that the lenses are soft at room temperature, e.g. between about 0° C. and 45° C. These lenses remain soft at much lower temperatures and still remain soft at much higher temperatures. However, normally the lenses will be used at temperatures ranging from about 0° C. to about 45° C.

The monomers should have preferably a molecular weight low enough so that the viscosity is low enough to spin cast the monomers e.g. about 175 stokes or below measured in Gardner viscosity tubes. Preferbly m is 50 to 800.

In accordance with another embodiment of this invention there are provided polymers of monomers which are poly(organosiloxane) terminally bonded through a divalent hydrocarbon group to an activated unsaturated group copolymerized with monomers containing an activated vinyl group.

The comonomer can be any polymerizable monomer which readily polymerizes by free radical polymerization and preferably is a monomer containing an activated vinyl group.

Illustrative of comonomers which can be usefully employed in accordance with this invention are:

The derivatives of methacrylic acid, acrylic acid, itaconic acid and crotonic acid such as:

methyl, ethyl, propyl, isopropyl, n-butyl, hexyl, heptyl, aryl, allyl, cyclohexyl, 2-hydroxyethyl, 2 or 3-hydroxypropyl, butoxyethyl, methacrylates; and propyl, isopropyl, butyl, hexyl, 2-ethyl hexyl, heptyl, aryl, acrylates; and propyl, isopropyl, butyl, hexyl, 2-ethyl hexyl, heptyl, aryl, itaconates; and propyl, isopropyl, butyl, hexyl, 2-ethyl hexyl, heptyl, aryl, crotonates.

Mono or di esters of the above mentioned acids with polyethers of the below general formula may be used:

$$HO(C_nH_{2n}O)_qH$$

wherein n is a number of from 1 to about 12, preferably 2 or 3, and q is a number of from 2 to about 6, preferably 2 to 3.

Other comonomers may include: styryls, such as, styrene, divinyl benzene, vinyl ethyl benzene, vinyl toluene etc.

Allylic monomers, such as, di allyl diglycol dicarbonate, allylcyanide, allyl chloride, diallyl phthalate, allyl bromide, diallyl fumarate and diallyl carbonate may be used.

Nitrogen containing monomers can be also used, such as: n-Vinyl pyrrolidone, 3-oxybutyl acrylamide, etc.

The lower the value of m in the formula for the instant monomers the more compatible are the monomers with the above mentioned comonomers.

The advantages of using the contact lens substrates, of the instant invention which are made from polymerizing the poly(organosiloxane) monomers of the instant invention are numerous. For example, (1) the advantages of using activated vinyl terminal groups to cure the siloxane material are (a) the high reactivity systems permit rapid cure at room temperature if suitable initiators are used. Room temperatures are preferred. This is desirable since the preferred method of casting the lens is spin casting. (b) No fillers are needed to get useful physical strength as is common with most silicone resins. This is desirable since the use of fillers requires that other possibly undesirable materials be added to the composition in order to correct the refractive index. When the term fillerless is used herein it is meant that the polymer i.e. the polysiloxane substrate, does not contain materials, such as, silicon dioxide or other commonly used fillers therein in order to improve the mechanical properties of the polysiloxane. As mentioned, the instant invention i.e. polysiloxanes, do not contain any fillers and is, therefore, fillerless. (2) Furthermore, the contact lenses made from the polymer of the instant invention are oxygen transporting. The human cornea requires about $2 \times 10^{-6}$ cm$^3$/(sec. cm$^2$ atm.) of oxygen through the contact lens as reported by Hill and Fatt, American Journal of Optometry and Archives of the American Academy of Optometry, Vol. 47, p. 50, 1970. When m is at least about 4 the chain of siloxane is long enough in the instant composition to exceed the oxygen transportability requirements of the cornea. Because of the unique properties of the contact lenses of the instant invention m may be great enough to allow sufficient oxygen transportability and at the same time the material still retain its desirable properties of elasticity, tear resistance, flexibility, resilience and softness.

When the term "oxygen transportability" or "oxygen transporting" is used in the instant application, it is meant that the material will allow sufficient transmission of oxygen through itself to supply the necessary oxygen requirements of the human cornea. The oxygen requirement for the human cornea as mentioned, is about $2 \times 10^{-6}$ cm$^3$/(sec. cm$^2$ atm.). The oxygen transportability was determined by a special test procedure described in conjunction with Example 3 herein. (3) These lenses are hydrolytically stable meaning that when the contact lenses are placed into an aqueous solution, e.g., in the eye, or during the disinfecting step, i.e. water plus heat, the lenses will not change in chemical composition, i.e. hydrolyze, which would cause the lenses to change shape resulting in an undesirable change in optics. (4) The more preferred contact lenses of the instant invention are also resilient. When the term resilient is used herein it is meant that after the lenses have been mechanically deformed the lenses will return quickly to their original shape. (5) The lenses are preferably made by spin casting, e.g. by the method as disclosed in U.S. Pat. No. 3,408,429. Monomers which have too high a viscosity cannot be spin cast. However, generally the higher the molecular weight of the monomers the longer the chain length, i.e. the larger the value of m, and as a consequence the more desirable the properties are for the preferred contact lenses of the instant invention. The longer the chain length and the higher the molecular weight the higher the viscosity. However, if spin casting is to be used the viscosity of the monomers must be such that these materials can be spin cast. The substrate materials of the instant invention can have molecular weights high enough to give all the desirable properties but low enough to be spin cast. The preferred weight average molecular weight is from about 4,000 to 60,000 for the monomers of the instant invention. (6) The most preferred contact lenses of the instant invention should be soft. By the use of the term "soft" in the instant application it is meant in the preferred embodiment that the lenses should have a Shore hardness of about 60 or below on the A scale. (7) The preferred contact lenses of the instant invention should be flexible. When the term "flexible" is used herein, it is meant that the contact lens is capable of being folded or bent back upon itself without breaking.

Biologically inert when used herein means that the contact lens of the instant invention is not toxic to living tissue or living organs, such as, the human eye.

The most preferred uncoated contact lens substrate, of the instant invention is a fillerless, oxygen transporting, flexible, hydrolytically stable, biologically inert, transparent, resilient, soft, polymeric contact lens comprising a poly(organosiloxane) terminally bonded through a divalent hydrocarbon group to a polymerized activated unsaturated group. The poly(organosiloxane) monomer has the formula in the most preferred contact lens of the instant invention of

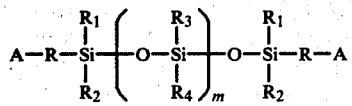

wherein A is selected from the group consisting of methacryloxy and acryloxy, R is an alkylene radical having from about 3 to about 4 carbon atoms and m is from about 50 to 800.

The above most preferred uncoated contact lenses substrates, of the instant invention, as mentioned, and fillerless, have an oxygen transport rate of at least about $2 \times 10^{-6}$ cm$^3$/(sec. cm$^2$ atm.), are hydrolytically stable, biologically inert, transparent, resilient, and have a softness preferably of about 60 or below on the Shore hardness A scale. Most preferably the Shore hardness is 25 to 35 on the A scale.

To further illustrate the most preferred contact lenses of the instant invention's physical properties, the tensile modulus of elasticity should be about 400 g/mm/mm$^2$ or less. Both the Shore hardness and modulus are related to the comfort of the lenses to the wearer when used on the human eye.

Another advantage of the preferred soft contact lenses of the instant invention is that lenses made from the polymers of the instant invention can be made large enough to cover the entire cornea of the eye resulting in more comfort. Hard contact lenses, such as PMMA poly(methyl methacrylate) lens, have to be made smaller due to their poor oxygen transportability. Furthermore, the larger the lenses, the easier it is to locate the optical center of the lenses. The larger the lens the easier it is to maintain the optical axis while the lens is being worn on the eye which is required of lenses used by people with particular eye problems, e.g., for those persons with astigmatism. Another advantage of the preferred uncoated soft lenses i.e. substrates, of the instant invention is that the instant preferred soft lenses have a softness similar to HEMA poly(hydroxyethyl methacrylate) lenses but in addition, and most importantly, are more oxygen permeable, i.e. are capable of transporting more oxygen. HEMA lenses are not oxygen permeable or capable of transporting oxygen to a degree necessary to meet all the requirements of the human cornea.

The glass coating of the instant invention is from about 100 to about 8000 Angstroms thick. The preferred thickness of the glass coating is from about 200 to about 800 Angstroms thick.

The glass coating is either silicate glasses, borosilicate glasses, special borosilicated glasses e.g. Na$_2$O-B$_2$O$_3$-SiO$_2$, such as disclosed in U.S. Pat. No. 2,106,744 incorporated herein by reference, phosphate glasses, germanate glasses or mixtures thereof.

After the special borosilicate glasses are coated onto the contact lens, the coating will be chemically etched.

The preferred glass coating is silicate glass. Silicate glasses when used herein may be the same as those disclosed by W. K. Lewis, L. Squires, and G. Broughton in "Industrial Chemistry of Colloidal & Amorphous Materials" pages 284–291 (1942) published by the MacMillan Company, New York, New York. The silicate glass coating may contain oxides which may be sodium oxide, potassium oxide, barium oxide, calcium oxide, magnesium oxide and boric oxide. Most preferably, the silicate glass is silica.

The glass coating may also be phosphate glasses. The phosphate glasses used herein may be the same as disclosed by W. A. Weyl and E. C. Marboe in "The Constitution of Glasses", Volume II, pages 569–584 (1964) Interscience Publishers, A Division of John Wiley & Sons, New York, New York. The phosphate glasses may contain oxides such as sodium oxide, potassium oxide, barium oxide, calcium oxide, magnesium oxide and boric oxide.

The glass coating may also be a germanate glass. The germania and germanate glasses used herein may be the same as those disclosed by W. A. Weyl and E. C. Marboe, in "The Constitution of Glasses", Volume II, pages 566–569 (1964), Interscience Publishers. A Division of John Wiley & Sons, New York, New York. The germanate glasses may also contain oxides which may be sodium oxide, potassium oxide, barium oxide, calcium oxide, magnesium oxide, and boric oxide.

In all the above situations, the coated polymeric contact lens disclosed herein is more hydrophilic than the surface of the substrate.

There are two preferred techniques for depositing the glass on to the siloxane substrate contact lens, sputtering and vacuum evaporation. However, before beginning coating the silicone rubber contact lens substrate of the instant invention with glass it is preferred that the surface of the substrate be cleaned or more preferably etched. These processes may be accomplished by exposing this surface to an oxygen plasma treatment for cleaning or by sputter etching.

For the oxygen plasma treatment the contact lens is placed in a hermatic vessel which is evacuated and then filled to a specific pressure with a reactive gas such as oxygen. The vessel is equipped with a target made of the material to be deposited i.e. coated, which is in the instant application glass. Also there is a substrate support between which a high voltage R.F. electrical field is established. The vessel may be made of stainless steel, aluminum or heat resistant glass so as to minimize reaction with the sputtered material or the substrate. The target usually consists of a disc which may be maintained at a particular temperature and contains the target material which in the instant invention is glass. A further feature of the usual apparatus includes high voltage conduits to bring the R.F. power to the target from sources on the exterior of the vessel. The substrate support is usually in a close position to the target and is also situated so it may be maintained at a controlled temperature. Between the substrate support and the target is situated a shutter, a flat metal sheet which may be inserted completely between the substrate and the target, or may be completely removed. During plasma treatment the shutter is kept closed, that is between the substrate and the target. At an oxygen pressure of from 2 millitorr to 1000 millitorr, preferably 3 millitorr, RF discharge is set up which, it is believed, cleans the surface of the lens allowing for better adherence between the substrate and the glass coating. The frequency of the electromagnetic radiation employed can vary over a wide range but should exceed about 10 megahertz. The frequency desirably employed is about 13.6 megahertz. The reaction time under which the substrate is exposed is from about 1 minute to about 60 minutes preferably 5 minutes to about 10 minutes for cleaning.

As mentioned, it is preferred that the plasma discharge be used at the beginning of the coating process. As known in the art, a plasma discharge may occur when a stream of plasma, for example, such as charged gas ions, e.g. oxygen, is directed at the substrate material. In some cases, the discharge may take place with residual gasses, in other cases it may take place in nitrogen, hydrogen or water vapor. However, the gas preferred in the instant invention is oxygen. The surface of the silicone rubber, which is to be coated with glass, is cleaned with the plasma treatment. As mentioned, better bonding between the substrate and the glass coating is obtained. The plasma oxidizes any residual matter on the surface of the silicone rubber and may oxidize the silicone surface.

Another preferred pretreatment of the uncoated contact lens prior to coating, as mentioned, is sputter etching. The lens to be coated may be placed in Modified Materials Research Corporation Model 8620 Sputtering Module. The module should have a shutter in the sputtering chamber between the target and the substrate support i.e. the material which holds the lens to be coated. A glass target, such as silica, may be placed in a relatively close proximity to the substrate area where the material to be coated is to be located. The substrate support material preferably may also be silica if the target material is to be silica. Having the target and substrate support made from this same material helps to prevent contamination in the module. Then the shutter is brought between the target and the support substrate.

The lenses are first placed on the target instead of the substrate support and sputter etched. The target sputters silica away from its surface and away from the surface of the lenses. The sputtered material will normally coat the shutter. Also, at this time the sputtering sputters away the surface of the lenses. Therefore, this process etches the lenses surface. The lenses, as mentioned, are located on the target. Sputter etching is continued for from 1 minute to about 10 minutes preferably about 1 minute. The net R.F. input power is from about ½ watt per square inch to about 5 watts per square inch, preferably about 1 watt per square inch. The vacuum in the module is from about 2 millitorr to about 10 millitorr, preferably about 3 millitorr.

After sputter etching the lenses are moved to the substrate support and the shutter removed between the target and the substrate support. Then sputter coating is started. At this time the lenses, located on the substrate support, are coated with silica from the silica target. Due to special electrical connections between the target and the substrate support, the lenses do not mechanically have to be moved from the target after sputter etching, to the substrate support for sputter coating. The electrical connections can be such that the target can now electrically become the substrate support and what was formerly the substrate support can now electrically become the target. Then all that is necessary is that the shutter between the target and the substrate support be removed and sputter coating of the lenses with preferably silica can begin.

With the sputter etching pretreatment of the uncoated contact lenses, the lenses may be coated with a thicker coating of glass without large cracks forming in the glass as is what happens when none of the pretreatments are used before coating. When no pretreatments are used, large cracks from about 75 microns to about 200 microns wide form in the glass coating. The wide cracks cause interference with the optical performance of the lenses when in the eyes. However, sputtering etching prevents these cracks from forming.

As mentioned, two coating techniques are preferred in the instant invention. These techniques are sputter coating and vacuum evaporation. Sputter coating is preferred over vacuum evaporation because it generally gives better bonding, better control when coating extremely thin layers and is more easily controlled without any damage to the substrate material.

In the sputter coating technique, more specifically a hermatic vessel is evacuated and then filled to a specific pressure with an inert gas such as argon or more preferably in the instant invention, oxygen. The vessel is equipped with a target made of the material to be deposited i.e. coated, which is in the instant application glass. Also there is a substrate support between which a high voltage R.F. electrical field is established. The vessel may be made of stainless steel aluminum or heat resistant glass so as to minimize reaction with the sputtered material or the substrate. The target usually consists of a disc which may be maintained at a particular temperature and contains the target material which in the instant invention is glass. A further feature of the usual apparatus includes high voltage conduits to bring the R.F. power to the target from sources on the exterior of the vessel. The substrate support is usually in a close position to the target and is also situated so it may be maintained at a controlled temperature.

In the instant sputtering technique, the reaction involves atoms or molecules flying from the target, i.e., the glass target, toward the substrate i.e., the silicone rubber contact lens, through the introduced gas during the flight, thus depositing an accurate glass coating on the surface of the substrate.

In the sputter coating technique of the instant invention, in order to concentrate the RF field and more importantly to eliminate certain electrons from the discharge, it is preferred that a magnetic field be applied. The magnetic field is applied in such a way as to spiral electrons out of the direct path to the substrate and send them back towards the target. By using this method the electrons do not hit and damage the substrate. These electrons go directly to the target.

Gasses which may be used in the instant invention include oxygen, nitrogen, hydrogen, and water. However, the preferred gas is oxygen.

It was found that it was also desirable to use a magnetic force, i.e., a magnetic field, in the vicinity of the plasma during sputter coating in order to eliminate large cracks in the glass coating. It was discovered that without the magnetic field during sputter coating, large cracks appeared in the surface of the glass coating on the silicone rubber contact lens, and these cracks are about 75 microns to about 200 microns wide. These large cracks were not present when a magnetic field was used. Stress grooves were also observed in the glass coating surface. Stress grooves are small ridges which are believed to be stress ridges which form on the surface of the coated contact lens as the coating becomes thicker.

When the thickness of the glass coating is kept between 100 to 8,000 Angstroms, this is thin enough so that these stress grooves do not form on the surface of the lens, or if these grooves do form, the grooves are small enough so that there is no interference with the optical performance of the lens when in the eye. As mentioned, it was found that when the thickness of the material remained within these limits, i.e. between 100 and 8,000 Angstroms, the stress grooves did not form or were not large enough to cause any distortion in the coated contact lens.

In vacuum depositing, streams of atoms are created thermally or by means of an electron gun within a pressure vessel under vacuum. The stream condenses upon anything in its path in the vessel including the exposed surface of the substrate. In the instant invention the substrate is a particular silicone rubber contact lens.

As mentioned, in a conventional vacuum apparatus used for thermal evaporation, an evaporating boat containing the material, i.e., glass, to be evaporated is placed in a particular location within the vacuum chamber. The substrates, i.e., silicone rubber contact lenses, to be coated are usually placed in a stationery location usually above the evaporation source. The source material is then heated by any suitable means such as induction or resistance heating or electron bombardment. Particles of the evaporated material, i.e., glass, in the instant invention, pass in a straight line from the source to the stationery substrate, i.e., the particular silicone rubber contact lens of the instant invention, and deposit on this substrate.

The wetting and hydrophilic properties of the glass coated contact lens of the instant invention are greatly improved over the uncoated silicone rubber contact lens. One of the methods in measuring this wettability is by measuring the contact angle. This contact angle enables one to determine how well water will wet the lens. A drop of water is usually dropped on the lens and it is determined whether it spreads out over the entire lens or beads up in one spot. The measurement of the contact angle of a liquid can be used to determine the surface tension. That is, beading can be seen on a non-wettable contact lens surface. This beading effect is used as an objective measure of surface tension. By measuring the angle often called "contact angle" a measure of surface tension can be made. Also, measurements can be made of the critical surface tension. The critical surface tension of water has been determined for various solids and liquids. That is the point at which water can completely wet a surface. In order for water to cover a surface, the critical surface tension of water must be equal to or lower than the critical surface tension of that surface. A very wettable surface, such as aluminum, has a critical surface tension of about 1,000 dynes per centimeter. The surface tension of polymethylmethacrylate (PMMA) is about 40 dynes per centimeter.

A desirable contact angle of a contact lens for human eyes is about 60 degrees or below measured by the Sessile Drop Method. It has been found that the contact angle of the glass coated silicone rubber contact lens of the instant invention is about 50 degrees and below. The contact angle of the uncoated silicone rubber contact lens i.e. substrates, of the instant invention is from about 100 degrees to about 110 degrees using the Sessile Drop Method for determining contact angle.

When the term "wettable" is used herein it is meant that the lens has a contact angle of about 60 degrees and below. When the term "hydrophilic" is used herein it is meant that the lens is compatible with or capable of uniting with water.

As mentioned, the wettability of hydrophilized lenses was determined by measuring the contact angle of a water drop on the lens. The contact angle measurements were determined by the Sessile Drop (air-$H_2O$) technique whereby a Sessile liquid drop on the surface is defined by the interior angle made by a line tangent to the curve of the image of the drop at the surface of the solid and a line defining the base of the drop.

The preferred method of coating the contact lens substrate of the instant invention with glass comprises providing a contact lens substrate made from the siloxanes disclosed herein. Then the contact lens substrate is preferably sputter etched before the lens is coated. When the lens is sputter etched the lens itself is used as the target material in the sputtering process. The "target" material, in the sputtering process, is the material from which material is sputtered. When the lens is used as a target in the sputtering process the lens is etched i.e. material is sputtered from the surface of the uncoated lens.

The preferred R.F. input power for sputter etching is from about ½ watt per square inch to about 5 watts per square inch, preferably about 1 watt per square inch in an atmosphere under vacuum conditions. The preferred atmospheric materials are oxygen, nitrogen, hydrogen and water. However, other gasses may be used. The preferred exposure time for the lens, when sputter etching, is from about 1 minute to about 10 minutes, preferably 1 minute. Preferably during sputter etching the vacuum is from about 2 millitorr to about 10 millitorr preferably about 3 millitorr.

The lens while being sputter etched is usually placed on a platform which is made of the same glass material which will later be used to coat the lens. Both the platform holding the lens and the lens, when used as a target in the sputtering process, are etched. Normally this sputtered material would be coated onto a receiving substrate. However, it is preferred in the instant application to have a shutter between the target and the receiving substrate so that when the lens is being sputter etched the sputtered material is coated onto the shutter and not the receiving material. Then after etching, the shutter is removed, and preferably the receiving material i.e. glass, now becomes the target material because of a switch in electrical connections. This target material i.e. glass, is now sputtered onto the lens. Preferably both the platform for the lens, when the lens is being sputter etched, and the receiving substrate, which now becomes the target when the lens is being sputter coated, both of these materials, are preferably made from the same substance. If silicate glass is being sputtered then both target and receiving material which is holding the lens would be silicate glass. This prevents contamination in the sputtering chamber.

As mentioned, after the sputter etching, the contact lens substrate, which is to be coated, is exposed to RF sputtering i.e. sputter coating, whereby a layer of glass is deposited from about 100 to about 8000 Angstroms thick, preferably 100 to about 800 Angstroms thick, onto the lens. The glass has an index of refraction of from about 1.4 to about 1.6 preferably 1.47 to 1.6. The glass is preferably silicate glasses, borosilicate glasses, phosphate glasses, germanate glasses and mixtures thereof. Most preferably the glass is silicate glass. The deposition comprises RF sputtering the glass onto the contact lens substrate at an RF input power of from about ½ watt per square inch to about 5 watts per square inch, preferably 1 watt per square inch in an atmosphere under vacuum conditions forming a glass coated contact lens substantially free of cracks in the glass coating of from about 75 to about 200 microns wide. The glass coated contact lens is flexible, wettable, hydrophilic, fillerless, hydrolytically stable, biologically inert, transparent, resilient, soft and has a sufficient amount of oxygen transportability to meet the requirements of the human cornea. Preferably during sputter coating the RF input power is about 1 watt per square inch. Preferably, the atmosphere is either oxygen, nitrogen, hydrogen or water. Preferably, the sputter coating time is from about ½ minute to about 20 minutes, preferably about 2 minutes. Preferably during sputter coating the vacuum is from about 2 millitorr to about 10 millitorr, more preferably 3 millitorr.

From the coating process described above, using the pretreatment of the lens i.e. sputter etching, one obtains a lens which has a large surface area i.e. a submicroscopic sponge like surface. This type of surface tends to trap water. This large surface area, which traps water, is most preferred since it promotes the wettability of the lens. Silicone, without pretreatment before coating, is normally smooth and as a result when the contact lens is placed on the eye it tends to push water out from under it. This is not desirable. It is more desirable to have a surface which traps water. As mentioned, the precoating treatment creates a surface which accomplishes this.

It should be noted that all, or any sequence of the processes described above, i.e. plasma treatment, sputter etching, sputter coating, vacuum deposition, etc., may be carried out in a sequence of connected chambers as well as in separate unconnected chambers.

The following examples are illustrative only and should not be construed as limiting the invention. All parts and percents referred to herein are on a weight basis and all viscosities measured at 25° C. unless otherwise specified.

EXAMPLE I 500.0 g. of octamethylcyclotetrasiloxane and 11.75 g of 1,3-bis(4-methacryloxybutyl) tetramethyl disiloxane are charged into a reaction vessel equipped with a mechanical stirrer. 5 ml of trifluoromethanesulfonic acid is added to the reaction vessel and the mixture stirred 18 hours at ambient temperature. The viscous fluid is neutralized with $Na_2CO_3$, diluted with hexanes, and filtered. The hexanes/monomer solution is washed with water, dried with $MgSO_4$ (anhydrous) and solvent removed at reduced pressure. Low molecular weight unreactive cyclic siloxanes are removed by heating the monomer to 110° C. at 0.2 mm Hg in a rotary evaporator. The product obtained is an odorless, colorless, clear fluid of 8.5 stokes viscosity measured in the Gardner Viscosity Tubes. The monomer comprises about 240 repeating $Me_2SiO$ units. Fluid collected during the devolatilizing of the product shows no methacrylate absorptions in IR spectra and could not be cured.

IR spectra of the monomer shows a light methacrylate absorption and broad siloxane absorptions between 1,000 and 1,100 $cm^{-1}$, indicative of linear poly(dimethyl siloxanes). The above monomer has the following formula:

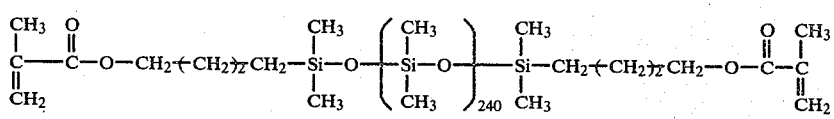

EXAMPLE II

The fluid product of Example I, together with 0.2% di (sec-butyl)-peroxydicarbonate is placed in a suitable contact lens spin casting mold and spin cast under polymerizable conditions to a contact lens such as taught in U.S. Pat. No. 3,408,429. The lens is optically clear, elastic and strong.

EXAMPLE III

The contact lens as prepared in Example II is placed in a vacuum chamber. The vacuum chamber is evacuated. After a pressure of about $10^{-2}$ Torr has been reached, the chamber is purged with pure oxygen. Subsequently, the oxygen present in the chamber by virtue of the purging procedure is evacuated, and pure oxygen is again admitted into the chamber until atmospheric pressure has been reached once more. Thereafter, the chamber is again evacuated, and the pressure in the chamber is adjusted to approximately $6 \times 10^{-4}$ Torr. Upon the application of a potential, a glow is immediately obtained. This preglow using oxygen plasma for at least two minutes is used in order to prepare the surface of the contact lens substrate for coating.

The direct deposition by RF sputtering of a continuous silica coating onto the contact lens of Example II is carried out, using a Modified Materials Research Corporation Model 8620 Sputtering Module on a Welch 3102 Turbomolecular Pump. A 12 inch diameter fused silica target is spaced about 2 inches above the siloxane contact lens surface. The silica is sputtered onto the siloxane contact lens for about 2 minutes. The ranges of sputtering conditions which resulted in a 100 Angstrom thick silica coating on the siloxane are:
Net RF input power—About 1 watt per sq. inch
Oxygen Gas Pressure—$3 \times 10^{-3}$ Torr.
The sample is found to have a continuous silica coating of about 100 Angstroms thick and the contact angle is near 0°. The resulting contact lens is hydrophilic, has excellent wetting characteristics and has good oxygen transport properties. The contact angle required for a contact lens to be acceptable for the human eye is at least about 60° and below. Therefore, the above contact lens has excellent wettability and hydrophilic characteristics with a contact angle of near 0°.

The Oxygen Transport Rate is determined by the following technique. This test is measuring the oxygen permeability of a material while it is wet with water. This is an attempt to closely reproduce the same conditions which exist in the human eye when fitted with a contact lens. Two chambers filled with water at 32° C. are connected together by a common passageway over which is placed the material to be tested. Nitrogen-purged water is pumped into both chambers until the oxygen concentration is very low (~0.04 ppm). Then air water (oxygen concentration ~8 ppm) is introduced into the lowest chamber. There is located in the upper chamber an oxygen sensing electrode which measures the diffusion of oxygen from the lower chamber through the membrane being tested and into the upper chamber. This measures apparent oxygen transport rate of the material covering the passageway between the two chambers.

The wettability of the lens is determined at room temperature by contact angle goniometry. The contact angles are measured on a NRL Contact Angle Goniometer (Model A-100 Rome-Hart, Inc., Mountain Lakes, New Jersey) by measuring the contact angle employing the Sessile droplet technique as described in Wettability of Hydrogels by Frank V. Holly and Miguel F. Refojo (J. Biomed. Mater. Res. 9, 315–326, 1975). The lenses are further tested for optical transparency and oxygen permeability.

The material as used in the below table was prepared as follows:

About 3 grams of the siloxane material as prepared in Example I was placed onto a glass plate which was coated with a solution of 15% dimethyldichlorosilane based on the total volume of the solution and 85% carbon tetrachloride based on the total volume of the solution which allows easy release of the material from the glass after the material has been polymerized on the plate.

Then the material was covered with a second glass plate. The material now contained between the glass plates was subjected to a sufficient amount of U.V. radiation so that the siloxane material polymerized. Then the glass plates were separated. The polysiloxane material easily released from one plate. However, the polysiloxane material still contained on the other plate was cut into two equal pieces. One piece was used, for example, as the material used in Example A of the table and the other half of the material was used for the material in Example $A_2$ of the table. Both A's were the same material. Both B's were the same material etc. for C's and D's.

Then the material was tested as follows:

In the table below P in column 3 equals oxygen permeability which equals $\Delta c/\Delta t \times VL/A$ wherein $\Delta c$ equals change in concentration in cc, $\Delta t$ equals change in time, V equals volume of the cell, L equals thickness of the sample tested, A equals area of the sample, therefore, $$P = \Delta c/\Delta t \times VL/A = [(cc) (STP) (cm)]/[(sec) (cm^2) (mm)].$$

In the table below column 4 shows the apparent oxygen transport rate which equals $$P/L \times 140)_L = [cc(STP)]/[(sec) (cm^2) (1 \text{ atm air})].$$

In the table below column 5 shows the oxygen transport rate of each sample with the thicknesses of samples normalized to 0.02 cm thick.

In the table below column 6 shows the transport rates from column 5 compared to the oxygen transport rate of HEMA. HEMA has an oxygen transport rate of about $4 \times 10^{-7}$ cm$^3$/(sec. cm$^2$ atm).

The contact angles by the Sessile drop test, the results of which are recorded in the below table at column 7, were obtained by placing a drop of water onto the substrate material to be tested. The angle formed by a tangent to the drop was measured using a goniometry. This angle, as mentioned, was recorded at column 7.

The receding contact angles, as recorded at column 8, were obtained by placing a drop of water onto the substrate material to be tested by the Sessile drop technique, and then a shringe needle was placed into the drop of water and a portion of the water was withdrawn. Then the angle formed by a tangent to the drop was measured on a goniometry. This angle is referred to as the receding contact angle and is recorded at column 8.

The two numbers i.e. angles, given in each space at column 7 and column 8 represent readings on each side of each sample. The difference in the readings of each side of the sample was attributed to the use of the carbon tetrachloride solution to prevent sticking of the material to one side of each glass plate.

| (1) SAMPLE # | (2) COMPOSITION | (3) OXYGEN PERMEABILITY(P) | (4) APPARENT OXYGEN TRANSPORT RATE | (5) OXYGEN TRANSPORT RATE SAMPLES THICKNESS NORMALIZED TO 0.02 cm. | (6) OXYGEN TRANSPORT RATE FROM COLUMN 5 COMPARED TO HEMA | (7) CONTACT ANGLE SESSILE DROP TEST | (8) CONTACT ANGLE (RECEDING) |
|---|---|---|---|---|---|---|---|
| $A_1$ | Material of Example I polymerized and coated | $1.46 \times 10^{-9}$ | $7.91 \times 10^{-6}$ | $8.66 \times 10^{-6}$ | 15.1 times greater | 98° 11° | 0° 0° |

-continued

| (1) SAMPLE # | (2) COMPOSITION | (3) OXYGEN PERMEABILITY(P) | (4) APPARENT OXYGEN TRANSPORT RATE | (5) OXYGEN TRANSPORT RATE SAMPLES THICKNESS NORMALIZED TO 0.02 cm. | (6) OXYGEN TRANSPORT RATE FROM COLUMN 5 COMPARED TO HEMA | (7) CONTACT ANGLE SESSILE DROP TEST | | (8) CONTACT ANGLE (RECEDING) | |
|---|---|---|---|---|---|---|---|---|---|
| | as in Example III (1 minute in coater) | | | | | | | | |
| $A_2$ | Same as $A_1$ Except Uncoated | $1.74 \times 10^{-9}$ | $1.11 \times 10^{-5}$ | $1.14 \times 10^{-5}$ | 19.75 times greater | 99° | 104° | 71° | 37° |
| $B_1$ | Material of Example I polymerized and coated as in Example III (2 minutes in coater) | $2.0 \times 10^{-9}$ | $1.08 \times 10^{-5}$ | $1.16 \times 10^{-5}$ | 20.1 times greater | 68° | 22° | 33° | 0° |
| $B_2$ | Same as $B_1$ except uncoated | $2.89 \times 10^{-9}$ | $1.58 \times 10^{-5}$ | $1.65 \times 10^{-5}$ | 28.65 times greater | 107° | 102° | 93° | 77° |
| $C_1$ | Material of Example I polymerized and coated as in Example III (5 minutes in coater | $1.46 \times 10^{-9}$ | $8.57 \times 10^{-6}$ | $9.05 \times 10^{-6}$ | 15.75 times greater | 12° | 17° | 0° | 0° |
| $C_2$ | Same as $C_1$ except uncoated | $2.63 \times 10^{-9}$ | $1.38 \times 10^{-5}$ | $1.46 \times 10^{5}$ | 25.4 times greater | 102° | 103° | 70° | 94° |
| $D_1$ | Material of Example I polymerized and coated as in Example III (10 minutes in coater) | $2.24 \times 10^{-9}$ | $1.31 \times 10^{-5}$ | $1.36 \times 10^{5}$ | 23.5 times greater | 19° | 36+ | 0° | 0° |
| $D_2$ | Same as $D_1$ except uncoated | $2.77 \times 10^{-9}$ | $1.44 \times 10^{-5}$ | $1.53 \times 10^{-5}$ | 26.5 times greater | 104° | 106° | 102° | 69° |

As to the $A_1$ sample which was coated with $SiO_2$ for one minute, the Sessile Drop test, the results of which was recorded at column 7 of the table, showed that the coated sample measured 98° on one side of the sample and 11° on the other side of the sample as compared to $A_2$, uncoated material, which measured 99° on one side of the uncoated sample and 104° on the other side of the uncoated sample. Furthermore, the Receding Contact Angle of $A_1$, the result of which were recorded at column 8 of the table, was 0° on both sides of the coated material as compared to 71° and 37°, respectively, on each side of the uncoated sample. Both of these tests show that the coated siloxane material has a considerable lower contact angle than the uncoated material. Therefore, the coated material is much more wettable and is, therefore, acceptable for use in the human eye.

As to the $B_1$ sample which was coated with $SiO_2$ for 2 minutes, the Sessile Drop test, the results of which was recorded at column 7 of the table, showed that the coated sample measured 68° and 22°, respectively, on each side of the sample, as compared to $B_2$, uncoated material, which measured 107° and 102°, respectively, on each side of the uncoated sample. Furthermore, the Receding Contact Angle of $B_1$, the results of which is recorded at column 8 of the table, was 33° and 0°, respectively, for each side of the sample, as compared to 93° and 77° for the uncoated sample. Both of these tests show that the coated siloxane material has a considerably lower contact angle than the uncoated material. Therefore, as mentioned above, the coated material is much more wettable and is, therefore, acceptable for use in the human eye.

As to the $C_1$ sample, which was coated with $SiO_2$ for five minutes, the Sessile Drop test, the results of which was recorded at column 7 of the table, showed that the coated sample measured 12° and 17°, respectively, on each side of the sample, as compared to $C_2$, uncoated material, which measured 102° and 103°, respectively, on each side of the uncoated sample. Furthermore, the Receding Contact Angle of $C_1$, the results of which was recorded at column 8 of the table, was 0° for both sides of the coated material as compared to $C_2$, uncoated material, which was 70° and 94°, respectively, for both sides of the uncoated material. Both of these tests again show that the $SiO_2$ coated siloxane material has a considerably lower contact angle than the uncoated material. Therefore, as mentioned above, the coated material is much more wettable and is, therefore, acceptable for use in the human eye.

As to the $D_1$ sample which was coated with $SiO_2$ for ten minutes, the Sessile Drop test, the results of which was recorded at column 7 of the table, showed that the coated sample measured 19° and 36°, respectively, on each side of the sample, as compared to $D_2$, uncoated material, which measured 104° and 106°, respectively, on each side of the uncoated sample. Furthermore, the Receding Contact Angle of $D_1$, the results of which was recorded at column 8 of the table, was 0° for both sides of the coated material as compared to $D_2$, uncoated material, which was 102° and 69°, respectively, for both sides of the uncoated material. Both of these tests again show that the $SiO_2$ coated siloxane material has a considerably lower contact angle than the uncoated material. Therefore, as mentioned above, the coated material is much more wettable and is, therefore, acceptable for use in the human eye.

It was also unexpected that after coating the siloxane material with glass that the oxygen transport rate would remain very high as compared to the uncoated material and as compared to HEMA. Columns 4 and 5 of the table show and compare the oxygen transport rate of the coated and uncoated samples. As can be seen, unexpectedly the coated material had a very high oxygen transport rate and is clearly acceptable for use in the human eye. Column 5 of the table shows how many times greater the oxygen transport rate of the coated and uncoated siloxane material is than the oxygen transport rate of HEMA. The range is from 15.1 times greater to 28.65 times greater. This is totally unexpected for the glass coated siloxane material of the instant invention.

It should also be pointed out that it was also unexpected that the contact lens made from the siloxane materials disclosed herein, after being coated with glass in the instant invention, would remain flexible, resilient and soft as defined herein and result in excellent contact lens for use in the human eye.

EXAMPLE IV

Another sputtering example was conducted in the same manner as in Example III except that the 12 inch diameter target is borosilicate glass and the sputtering times are 1, 5 and 10 minutes.

The contact angle for the 1 minute sputtered material is about 56°. The contact angle for the 5 minute sputtering is about 49° and the contact angle for the 10 minute sputtered material is about 34°. These lenses are hydrophilic and have excellent wetting characteristics.

The critical contact angle required for a contact lens to be acceptable for the human eye, as mentioned, is at least about 60° and below.

EXAMPLE V

A 600 Angstrom thick film of silica ($SiO_2$) is formed on a siloxane contact lens substrate as formed in Example II. 100 grams of the silica is placed in a heated crucible. The vacuum chamber is evacuated to a vacuum of about $1 \times 10^{-5}$ Torr, with the siloxane contact lens substrate being suspended about 10 inches above the crucible and maintained at a substrate temperature of about 30° C. to 200° C. during evaporation. The $SiO_2$ in the crucible (top layer) is maintained at a temperature of about 2000° C. for about 5 minutes to form a silica layer of about 600 Angstroms thick on the siloxane contact lens. The material in the crucible is heated and evaporated by using an electron beam as a heat source. At the end of the vacuum evaporation, the crucible and glass are cooled to room temperature, the vacuum then broken, and the coated siloxane contact lens removed from the vacuum chamber.

The contact angle of the material is tested and it is about 30°. The contact angle, as mentioned, required for a contact lens to be acceptable for the human eye is at least about 60° and below.

We claim:
1. A sufficient amount of oxygen transportability to meet the requirements of the human cornea, wettable, hydrophilic, fillerless, flexible, hydrolytically stable, biologically inert, transparent, resilient, soft, glass coated polymeric contact lens comprising an outer continuous coating of substantially colorless transparent glass from about 100 to about 8000 Angstroms thick with an index of refraction from about 1.4 to about 1.6, said glass being selected from the group consisting of silicate glasses, borosilicate glasses, phosphate glasses, germanate glasses and mixtures thereof, said substrate having a glass transition temperature below about 0° C., said substrate consisting essentially of a poly(organosiloxane) terminally bonded through a divalent hydrocarbon group to a polymerized activated unsaturated group, said poly(organosiloxane) having the formula:

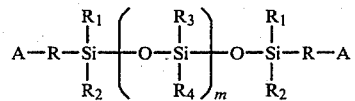

wherein A is an activated unsaturated group, R is a divalent hydrocarbon radical having from 1 to about 22 carbon atoms, $R_1$, $R_2$, $R_3$, and $R_4$ can be the same or different and is selected from the group consisting of a monovalent hydrocarbon radical, a halogen substituted monovalent hydrocarbon radical, each having from 1 to 12 carbon atoms and m is 25 or greater.

2. The coated polymeric contact lens according to claim 1 wherein the glass coating is from about 200 to about 800 Angstroms thick.

3. The coated polymeric contact lens according to claim 1 wherein the glass coating has a refractive index of between about 1.46 and 1.6.

4. The coated polymeric contact lens according to claim 1 wherein the glass coating is silicate glass.

5. The coated polymeric contact lens according to claim 4 wherein the silicate glass coating contains oxides selected from the group consisting of sodium oxide, potassium oxide, barium oxide, calcium oxide, magnesium oxide and boric oxide.

6. The coated polymeric contact lens according to claim 4 wherein the silicate glass is silica.

7. The coated polymeric contact lens according to claim 1 wherein the glass coating is borosilicate glass.

8. The coated polymeric contact lens according to claim 7 wherein the borosilicate glass coating contains oxides selected from the group consisting of sodium oxide, potassium oxide, barium oxide, calcium oxide, magnesium oxide and boric oxide.

9. The coated polymeric contact lens according to claim 1 wherein the glass coating is phosphate glasses.

10. The coated polymeric contact lens according to claim 9 wherein the phosphate glasses contain oxides selected from the group consisting of sodium oxide, potassium oxide, barium oxide, calcium oxide, magnesium oxide and boric oxide.

11. The coated polymeric contact lens according to claim 1 wherein the glass coating is germanate glass.

12. The coated polymeric contact lens according to claim 11 wherein the germanate glass contains oxides selected from the group consisting of sodium oxide, potassium oxide, barium oxide, calcium oxide, magnesium oxide and boric oxide.

13. The contact polymeric contact lens according to claim 1 wherein the coating of glass is more hydrophilic than the surface of the substrate.

14. The coated polymeric contact lens according to claim 1 wherein the m is a number of from about 50 to about 800.

15. The coated polymeric contact lens according to claim 14 wherein A is selected from the group consisting of 2-cyanoacryloxy, acrylonitryl, acrylamido, acryloxy, styryl, methacryloxy, N-vinyl-2-pyrrolidone-3-yl, N-vinyl-2-pyrrolidone-4-yl and N-vinyl-2-pyrrolidone-5-yl and R is an alkylene radical and $R_1$, $R_2$, $R_3$ and $R_4$ is an alkyl radical having from 1 to 10 carbon atoms.

16. The coated polymeric contact lens according to claim 15 wherein the alkylene radical has from about 1 to about 4 carbon atoms.

17. The coated polymeric contact lens according to claim 16 wherein the alkylene radical has from about 3 to about 4 carbon atoms.

18. The coated polymeric contact lens according to claim 17, wherein $R_1$, $R_2$, $R_3$ and $R_4$ are selected from the group consisting of a methyl radical and a phenyl radical.

19. The coated polymeric contact lens according to claim 18 wherein $R_1$, $R_2$, $R_3$ and $R_4$ are methyl radicals.

20. The coated polymeric contact lens according to claim 1 wherein the poly(diorganosiloxane) comprises a copolymer of a poly(diorganosiloxane) terminally bonded through a divalent hydrocarbon group to an activated unsaturated group and one or more monomers selected from the group consisting of a lower ester of acrylic and methacrylic acids, styryls, allyls and vinyls.

21. The coated polymeric contact lens according to claim 20 wherein the monomers are selected from the group consisting of styrene, N-vinyl pyrrolidone and diallyl diglycal carbonate.

22. The coated polymeric contact lens according to claim 21 wherein the monomer is selected from the group consisting of allyl methacrylate, butoxyethylmethacrylate, cyclohexyl methacrylate, ethyl methacrylate, methylmethacrylate, ethyl hexyl acrylate, n-butyl, acrylate, butyl acrylate and N-vinyl pyrrolidone.

23. A method of coating a flexible polymeric contact lens substrate with glass resulting in the flexible lens becoming more wettable and more hydrophilic comprising:
(a) providing a contact lens substrate consisting essentially of a poly(organosiloxane) terminally bonded through a divalent hydrocarbon group to a polymerized activated unsaturated group, said poly(organosiloxane) having the formula:

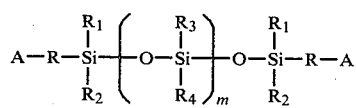

wherein A is an activated unsaturated group, R is a divalent hydrocarbon radial having from 1 to about 22 carbon atoms, $R_1$, $R_2$, $R_3$ and $R_4$ can be the same or different and is selected from the group consisting of a monovalent hydrocarbon radical, a halogen substituted monovalent hydrocarbon radical, each having from 1 to 12 carbon atoms and m is 25 or greater;
(b) exposing said contact lens substrate as a material to be etched to RF sputtering as target material at an RF input power of from about ½ watt per square inch to about 5 watts per square inch in an atmosphere under vacuum conditions resulting in etching of the surface of said contact lens substrate; and
(c) then exposing said contact lens substrate as a material to be coated to RF sputtering thereby depositing a layer of glass from about 100 to about 8000 Angstroms thick with an index of refraction of from about 1.4 to about 1.6 onto the contact lens substrate, said glass is selected from the group consisting of silicate glasses, borosilicate glasses, phosphate glasses, germanate glasses and mixtures thereof, said deposition comprising RF sputtering said glass onto said contact lens substrate at an RF input power of from about ½ watt per square inch to about 5 watts per square inch in an atmosphere under vacuum conditions forming a glass coated contact lens substantially free of cracks in the glass coating of from about 75 to about 200 microns wide, said lens being flexible, wettable, hydrophilic, fillerless, hydrolytically stable, biologically inert, transparent, resilient, soft and has a sufficient amount of oxygen transportability to meet the requirements of the human cornea.

24. The method according to claim 23 wherein the RF input power in Step (b) is about 1 watt per square inch.

25. The method according to claim 23 wherein the exposure time in step (b) is from about 1 minute to about 10 minutes.

26. The method according to claim 25 wherein the exposure time in step (b) is 1 minute.

27. The method according to claim 23 wherein the atmosphere in step (b) is a material selected from the group consisting of oxygen, nitrogen, hydrogen and water.

28. The method according to claim 23 wherein the vacuum in step (b) is from about 2 millitorr to about 10 millitorr.

29. The method according to claim 28 wherein the vacuum in step (b) is 3 millitorr.

30. The method according to claim 23 wherein the glass layer thickness in step (c) is from about 100 about 800 Angstroms thick.

31. The method according to claim 23 wherein the glass in step (c) is a silicate glass.

32. The method according to claim 23 wherein the RF input power in step (c) is about 1 watt per square inch.

33. The method according to claim 23 wherein the exposure time in step (c) is from about ½ minute to about 20 minutes.

34. The method according to claim 33 wherein the exposure time in step (c) is 2 minutes.

35. The method according to claim 23 wherein the vacuum in step (c) is from about 2 millitorr to about 10 millitorr.

36. The method according to claim 35 wherein the vacuum in step (c) is 3 millitorr.

37. The method according to claim 23 wherin the atmosphere in step (c) is a material selected from the group consisting of oxygen, nitrogen, hydrogen and water.

* * * * *